United States Patent [19]
Camarota et al.

[11] Patent Number: 5,272,603
[45] Date of Patent: Dec. 21, 1993

[54] LIGHT FIXTURE

[75] Inventors: Richard J. Camarota; James H. Miller, both of Holland; Steven R. Isenga, Zeeland, all of Mich.

[73] Assignee: ITC Incorporated, Zeeland, Wash.

[21] Appl. No.: 923,386

[22] Filed: Jul. 31, 1992

[51] Int. Cl.⁵ .............................................. F21V 33/00
[52] U.S. Cl. ..................... 362/95; 362/190; 362/295; 362/311; 362/394
[58] Field of Search .............. 362/61, 80, 83.3, 95, 362/147, 190, 191, 295, 311, 363, 394

[56] References Cited

U.S. PATENT DOCUMENTS

| | | |
|---|---|---|
| D. 315,216 | 3/1991 | Kelley et al. |
| 3,792,250 | 2/1974 | Kilbourn et al. |
| 4,118,764 | 10/1978 | Bleiweiss et al. ............ 362/61 |
| 4,285,033 | 8/1981 | Hart . |
| 4,872,099 | 10/1989 | Kelley et al. |
| 4,930,056 | 5/1990 | Stephenson et al. |
| 5,003,449 | 3/1991 | Stephenson et al. |
| 5,152,599 | 10/1992 | Lewis et al. ................ 362/80 |

OTHER PUBLICATIONS

1988 Discount Accessory Catalog-Goldbergs' Marine, cover and pp. 180 and 181.
West Marine Products Master Catalog, 1991 cover and pp. 141, 142, 143.

Primary Examiner—Carroll B. Dority
Attorney, Agent, or Firm—Flynn, Thiel, Boutell & Tanis

[57] ABSTRACT

A light fixture, particularly adapted for use in vehicles, including land recreational vehicles and boats, comprises a base fixable on a mounting surface of a vehicle and including provision for mounting a lamp to shine forward from the base. A light transmitting lens mounts in front of the base for covering a lamp mounted on the base. The lens is convexly shaped and laterally overhangs the base with a peripheral portion adapted to lie close to the mounting surface at a height less than the height of the base. The lens has a central portion extending from the peripheral portion and overlapping the base for transmitting light from a lamp on the base. A lamp actuating switch is located on the base under the lens and upon depression of the lens by the user changes the state of the switch and the condition of illumination of the light fixture.

19 Claims, 4 Drawing Sheets

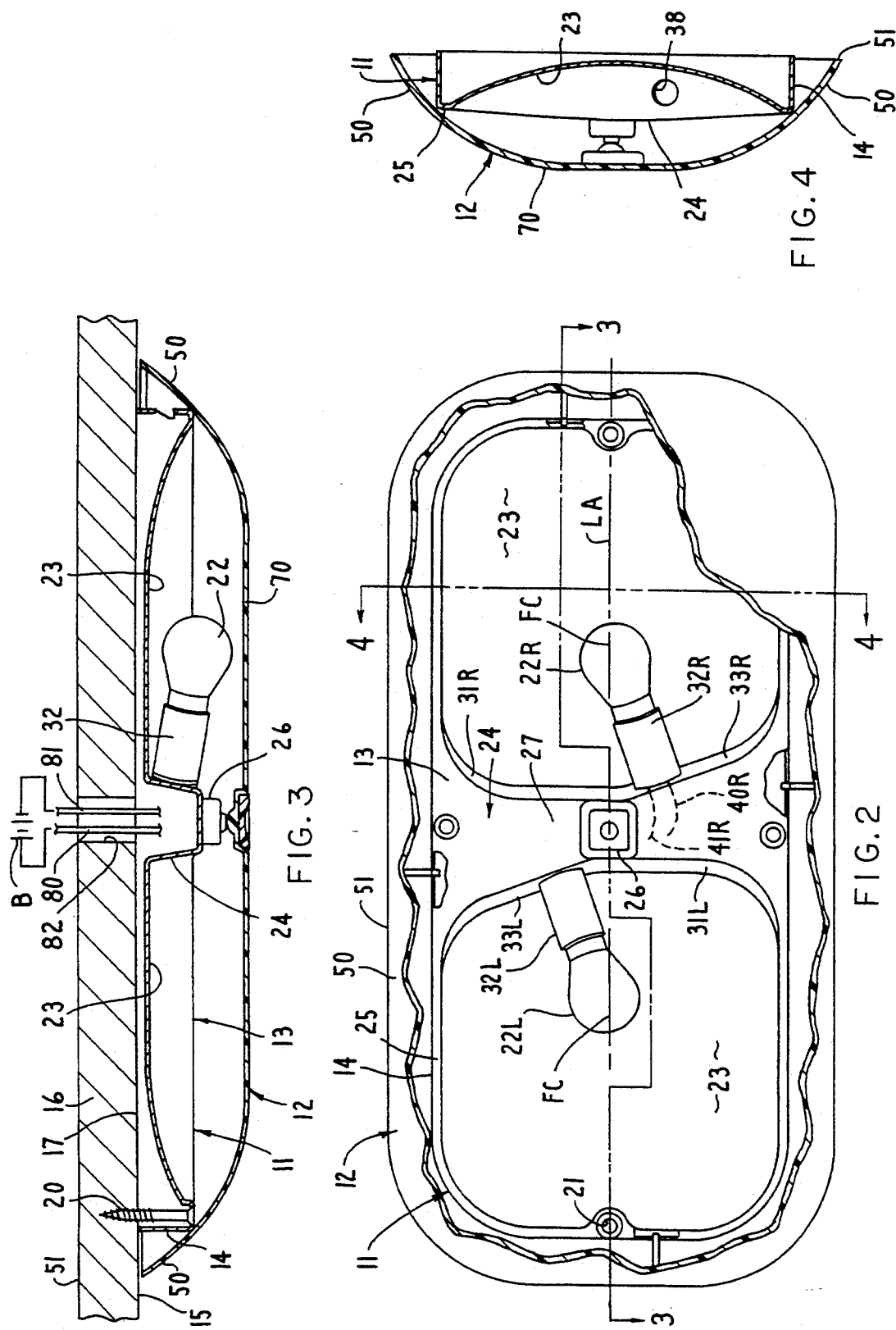

LIGHT FIXTURE

FIELD OF THE INVENTION

This invention relates to a light fixture, and more particularly to a light fixture adapted for use in vehicles, including land recreational vehicles and boats.

BACKGROUND OF THE INVENTION

Light fixtures of the kind particularly adapted for use in vehicles, including land recreational vehicles and boats, have long been known. Popular prior fixtures are typically mounted on an interior wall or ceiling of, for example, a boat cabin or travel trailer or motor home and are wired to the battery supply of the vehicle (typically 12 volts DC power) for actuation by a slider switch on the exposed base of the fixture. Typically, such a prior fixture has a light transmitting lens mounted forwardly on the base to leave exposed to view a substantial portion of the base perimeter wall. Such lens may be removably fixed on the base in various ways, one way being to provide the lens with a laterally outward extending perimeter flange that slips under a lip on the base. In one prior dual lamp fixture, two separate lenses are provided, one to cover each lamp. In one such prior dual lamp fixture, five separate major pieces are needed to define a common base, the two lenses and means connecting the lenses to the base. In prior single and twin lamp fixtures of this general kind, the outward appearance is of a multi-piece, sharp-edged assembly defined by one or two blocklike masses. In general, prior lamps of this kind have been relatively expensive to make and, in view of the substantial number of parts, required a relatively large and costly manufacturing and maintenance inventory.

Accordingly, the object and purposes of the present invention include provision of a light fixture, particularly adapted for use in vehicles, including land recreational vehicles and boats, and which is capable of overcoming various disadvantages of prior fixtures of the general type discussed above.

Further objects and purposes of the invention will be apparent to persons acquainted with apparatuses of this general type upon reading the present specification and inspecting the accompanying drawings.

BRIEF DESCRIPTION OF THE DRAWINGS

FIG. 2 is a view similar to FIG. 1 but enlarged and with a portion of the lens broken away to show a portion of the front of the base and means connecting the lens and base.

FIG. 3 is a view substantially taken on the line 3—3 of FIG. 2.

FIG. 4 is a sectional view substantially taken on the line 4—4 of FIG. 2 and with the lamp socket removed.

According to the invention, a light fixture, particularly adapted for use in vehicles, including land recreational vehicles and boats, comprises a base fixable on a mounting surface of a vehicle and means for mounting a lamp to shine forward from the base. A light transmitting lens is mountable in front of the base and for covering a lamp mounted on the base.

DETAILED DESCRIPTION

Figure 1:
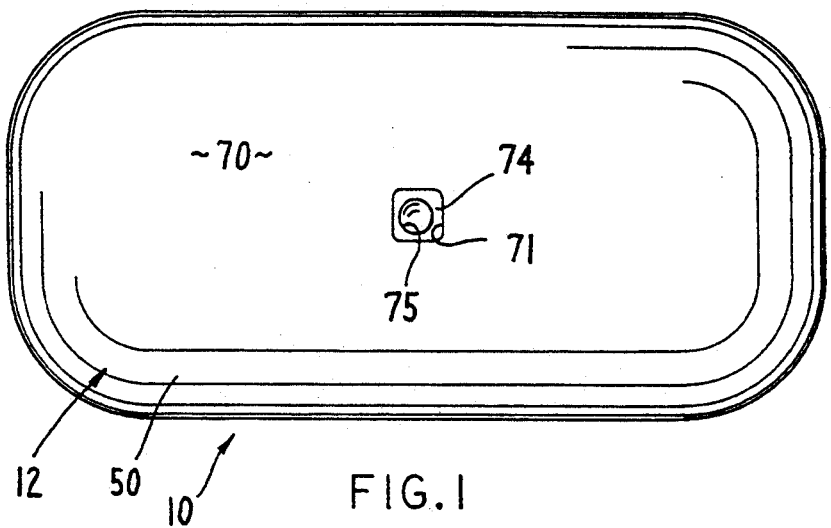
FIG. 1 is a front view of a dual lamp light fixture embodying the invention.

A light fixture 10 (FIGS. 1-3), embodying the invention, includes a generally rectangular base 11, the front face 13 of which is covered by a removable lens 12.

The base 11 here comprises an outer sidewall 14 at the perimeter thereof and extending rearward from the front face 13 and having a rear edge 17 to engage a mounting surface 15 (FIG. 3), typically, the front surface of a wall or ceiling panel 16 of a vehicle, for example, of a land recreational vehicle, such as a travel trailer or motor home or of a boat cabin. Thus, when so installed, the rear edge 17 of the base sidewall 14 engages the front mounting surface 15 of the panel 16, preferably in a substantially continuous manner around the periphery of the base 11. The base 11 is releasably fixed to the panel 16 by any convenient means, here screws 20. In the FIG. 2 embodiment, four such screws 20 are spaced along the perimeter portion of the base front face 13. In the embodiment shown, the screws 20 are flathead screws and are received in countersunk holes 21 (FIG. 2) in the front face 13 of the base 11 adjacent the sidewall 14. In the embodiment shown, one such screw and screw hole are substantially centered along each side of the base 11.

The base 11 is laterally elongate. The base 11 has two forward opening recesses 20 formed by depressions in the front face 13 and in which respective lamps 22 are to be located. The lamps 22 may be conventional, here for example 12 volt lamps of the kind typically used in vehicle interior lighting.

The recesses 23 act as reflective wells for their respective lamps 22. The recesses 23 are separated by a central longitudinally extending ridge 24 which extends across the central width of the front face of the base 11. As seen in FIG. 4, the central portion of the ridge 24 extends forward somewhat beyond the plane of the forward edge 25 of the sidewalls 14. Centered atop the ridge 24 (FIGS. 2 and 3) is a conventional push button switch 26.

In one unit embodying the invention, the switch 26 was a Model 987 Flat-Pac made by Judco located at Harbor City, Calif.

The switch 26 is fixed to the front face 27 of the ridge 24 by any conventional means not shown. An actuating push button 28 (FIG. 3A) protrudes forward from the front face of the switch 26 and is spring biased forward. A rearward displacement of the push button 28 changes the state of the switch 26, which state is held until the next push.

Figure 3A:
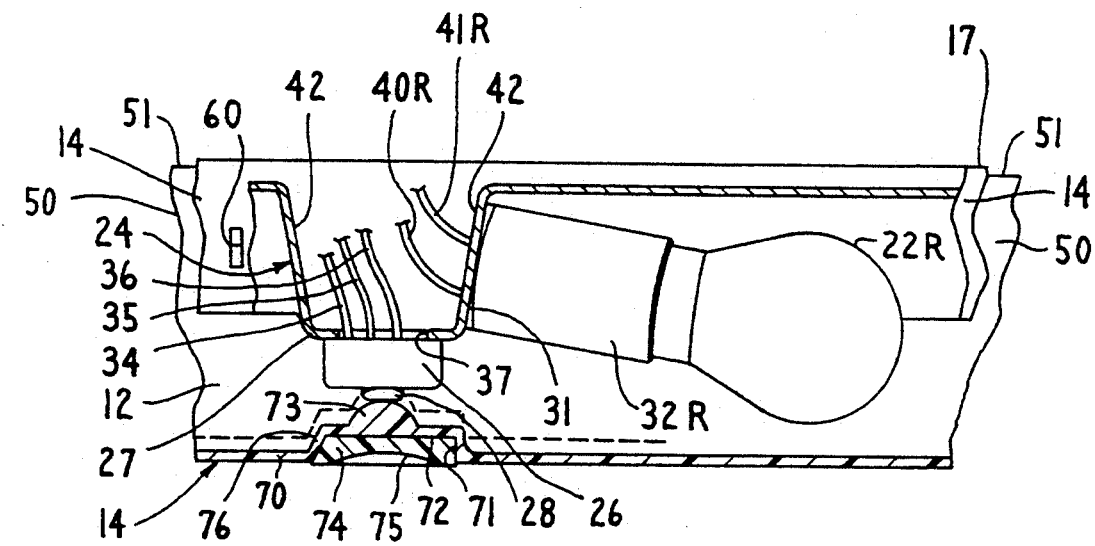
FIG. 3A is an enlarged fragment of FIG. 3.

The sides 31 of the ridge 24 converge slightly as they extend forward to give the ridge 24 a forward tapering cross-section as seen in FIG. 3A. Fixed, by any conventional means not shown, to the opposite sides 31 of the ridge 24 are conventional lamp sockets 32 which fixedly but removably receive respective ones of the lamps 22 in a conventional manner. The sockets 32 extend perpendicularly from respective sides 31 of the ridge 24 and thus, in view of the taper of the ridge in cross-section, the sockets 32 and lamps 22 angle somewhat forwardly as they extend into the respective recesses 23 of the base 11. Further, as seen in FIG. 2, each ridge side 31 has a portion 33 which angles acutely from the remainder of the corresponding ridge side 31 and thus angles at less than 90° to the length axis LA of the base. The sockets 32 are mounted on respective ones of these angled portions 33 of the ridge sides 31 as seen in FIG. 2. Further as seen in FIG. 2, the angled side portion 33 of the left recess 23 angles up and leftward whereas the angled sidewall portion 33 of the right recess 23 angles down and rightward. The presence of the angled portions 33 of the ridge sides 31 effectively makes the shape of each recess, as seen from the front in FIG. 2, five-sided. More of interest, the sockets 32 are mounted on the respective angled ridge side portions 33. Thus, the left socket 32L is spaced somewhat above the base longitudinal axis LA whereas the right socket 32R is spaced somewhat therebelow. In consequence, the sockets 32, as seen from the front in FIG. 2, extend from the ridge side portions 33 toward the base longitudinal axis LA, here in a manner to place the filament center FC of the corresponding lamp 22 substantially on the base longitudinal axis LA. Each recess 23 in the base 11 is shaped to reflect forward the light from its corresponding lamp 22 in a relatively even manner, over the forward facing area of the corresponding recess 23.

As seen schematically in FIG. 3A, insulated wires 34, 35 and 36 extend rearward from the switch 26 through a suitable hole 37 centered in the front face 27 of the ridge 24. Insulated wires 40R and 41R extend from the rightward socket 32R (FIG. 3A). Similarly, insulated wires 40L and 41L extend from the left lamp socket 32L (see FIGS. 2 and 3B). The wire pair 40R, 41R and the wire pair 40L, 41L each extend from their respective socket 32R and 32L through a respective hole (as at 38 in FIG. 4) in the corresponding ridge side portion 33R and 33L into the rear facing recess 42 defined within the ridge 24.

Figure 3B:
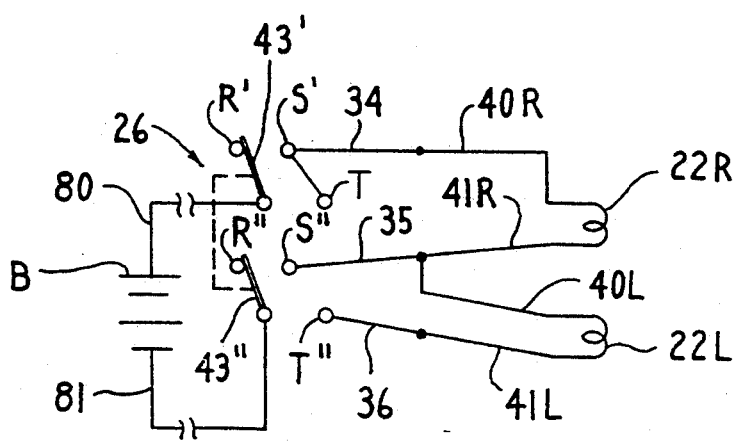
FIG. 3B is a schematic circuit diagram of the apparatus of FIGS. 1-3.
Figure 5:
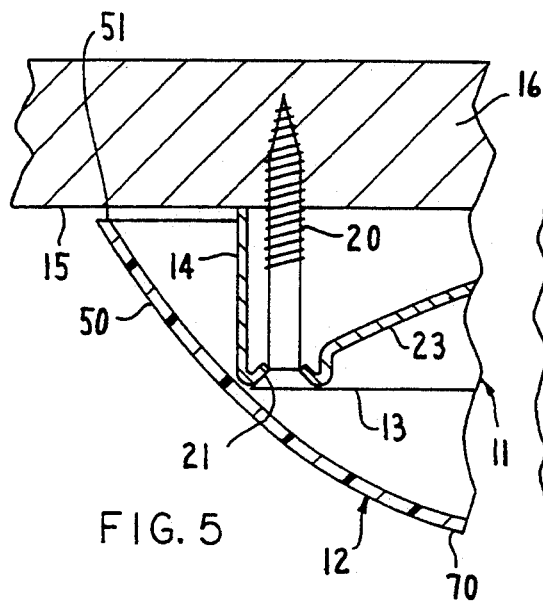
FIG. 5 is an enlarged fragment of FIG. 3.

The interior structure of the switch 26 may be of a variety of types. FIG. 3B simply shows schematically one possible circuit arrangement of switch 26, lamps 22R and 22L and a battery B. The battery B may, for example, be the vehicle's storage battery and located remote from the light fixture 10. Elongate insulated wires 80 and 81 here connect respective switch contacts 43' and 43" to the opposite terminals of the battery B. In FIG. 3B, the switch 26 is shown to have a pair of ganged movable contacts 43' and 43" respectively alternatively engageable with fixed contact set R', S', T' and R", S", T" which are connected as shown to the switch wires 34, 35 and 36, in turn connected as shown to the lamp wires 40R, 41R, 40L and 41L. The switch 26 particularly shown in FIG. 3B thus has a first position represented by engagement of fixed contacts R' and R" in which no lamp is lit, a second position represented by engagement of fixed contacts S' and S" in which one lamp 22R is lit and a third position represented by contact with fixed contacts T' and T" in which both lamps 22R and 22L are lit. Mechanisms by which successive actuations of the push button 28 can result in staging of movable switch contacts 43' and 43" to the above mentioned R, S and T contact sets, or their equivalent, are conventionally known and need not be further discussed here.

The switch 26 and lamp sockets 32 are fixed to their corresponding surfaces of the ridge 24 by any conventional means not shown.

The lens 12 (FIGS. 1, 3 and 4) is Convexly shaped and of laterally dimension exceeding the lateral dimension of the base 11, such that the lens 12 has a peripheral portion 50 extending laterally beyond and laterally surrounding the base. The convexly shaped lens 12 thus covers the base and is disposed in front thereof, the lens 12 here curving rearward as it extends laterally outward past the sidewall 14 of the base 11. The peripheral edge 51 of the lens is thus spaced laterally outboard from the base sidewall 14. The peripheral edge 51 is located almost as far to the rear as the rear edge 17 of the base, so as to lie very close to the front of a panel 16 on which the base is fixed. In this way, the lens hides the base from view, no matter what the location of the viewer in front of the panel 16 on which the light fixture 10 is mounted.

The lens 12 is, in the preferred embodiment shown, removably fixed to the base 11 by snap fit connection which requires no tools for installation of the lens on the base or removal of the lens from the base. More particularly, the snap fit connection is provided at several places spaced along the perimeter of the base. In the embodiment shown, such locations are each approximately centrally located on each of the four sides of the base 11.

Figure 6:
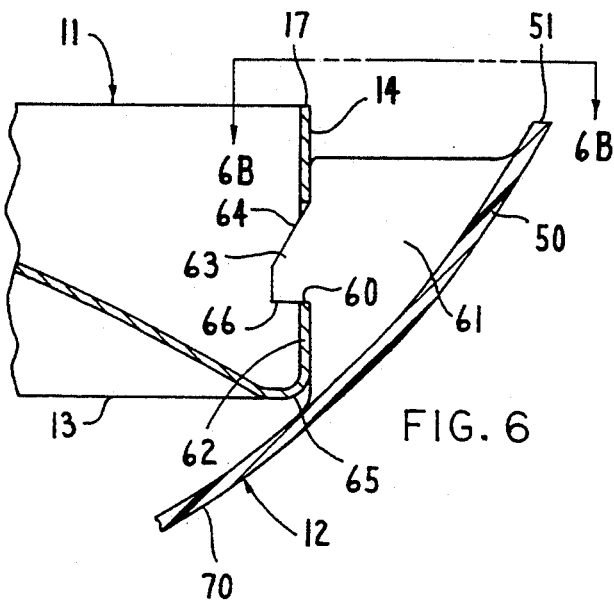
FIG. 6 is an enlarged fragment of FIG. 3.
Figure 6A:
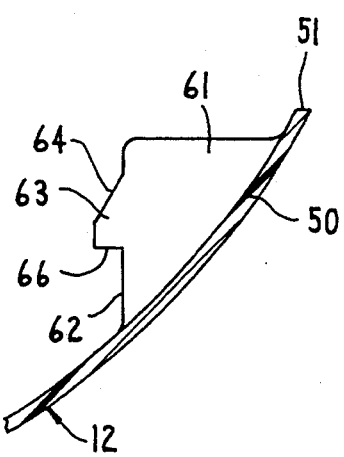
FIG. 6A is a view similar to FIG. 6 but with the base removed and showing merely a mounting means of the lens.
Figure 6B:
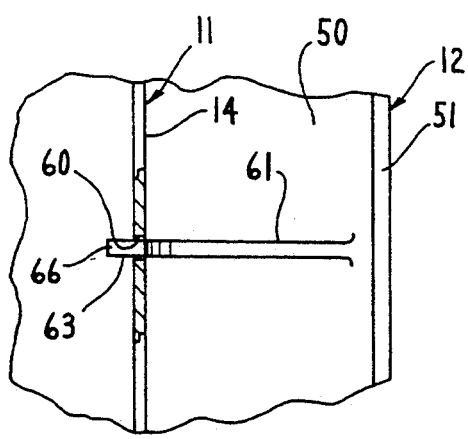
FIG. 6B is a fragmentary sectional view substantially taken on the line 6B-6B of FIG. 6.

In the preferred snap fit connection shown in FIGS. 6 and 6B, the sidewall 14 of the base, at approximately mid-height, is provided with a substantially rectangular hole 60 (FIG. 6). The hole 60 is of substantially greater extent in the forward-rearward direction than in the lateral or perimetral direction (see for example FIG. 3A). The portion of the snap fit connection on the lens 12 (FIGS. 6, 6A and 6B) comprises a fin 61 fixed to the lens peripheral portion 51 at its back face, as by integrally molding the fin 61 with the lens 12. The fin is substantially perpendicular to the adjacent lens peripheral portion 50 and extends laterally therefrom to its inner edge 62 which is adapted to extend rearward closely along the base sidewall 14 at the hole 60 therein.

The fin has a tab 63 (here integral) extending from its inner edge 62 laterally into the hole 60 in the base sidewall 14. The tab has a sloped rear edge 64 for sliding rearward along the sidewall 14 of the base and into the hole 60 therein. The peripheral portion 50 of the lens 12 is sufficiently flexible as to deflect outward to allow the tab 63 to slide over the forward facing corner 65 of the base and along the base sidewall 14 rearwardly toward the hole 60, to allow the tab 63 to reach and drop into such base hole 60. The tab 63 has a front edge 66 which extends substantially parallel to the axis of the hole 60, and to the plane of the lens peripheral edge 51. The tab front edge 66 thus interferes in a steplike manner with the front end of the base hole 60 to block unintended forward escape of such tab 63 from such hole 6 and thereby lock the lens 12 on the base 11.

Thus, the particular light fixture shown in FIGS. 1-6 is provided with four such holes 60 circumferentially distributed on the sidewall 14 on the base 11 and four corresponding fins 61 with tabs 63 similarly peripherally distributed on the laterally inner or rear face of the lens 12 for fixedly but removably securing the lens on the front of the base 11. To install the lens 12 on the base 11, one merely pushes the lens 12 rearward toward the base 11 in a substantially centered manner, whereby the sloped rear edges 64 of the tabs 63 skid rearwardly along the outside of the base sidewalls 14 and snap into the holes 60 therein. Removal of the lens from the base is accomplished by springing laterally outward (to the right in FIG. 6) the peripheral portion 50 of the lens 12 adjacent each finger 61, so as to draw the corresponding tabs 63 out of their respective holes 60, whereby the lens 12 can then be moved forward off the base 11.

The tabs 63 and holes 60 (FIG. 6) are so located with respect to each other that the lens 12 lies very close to the front facing corner edge 65 of the base 11, so that light from the lamps 22 will be effectively blocked from scattering laterally outwardly past such corner edge 65. Accordingly, light from the lamps 22 tends to be transmitted forwardly through the central portion 70 of the lens 12. This tends to substantially eliminate irregular splashes of light laterally beyond the sides 14 of the base 11 and particularly beyond the peripheral edge 51 of the lens 12.

A central, generally square-shaped depression 71 in the lens 12 is concave forwardly and convex rearwardly (FIGS. 1 and 3A) and is located directly in front of the switch 26. The rear wall 72 of the depression 71 has a centrally located rearwardly protruding projection 73, here of substantially semicircular cross-section (FIG. 3A). The projection 73 is centered on and snugly abuts the front end of the push button 28 of the switch 26. The central portion 70 of the lens 12 is sufficiently flexible that light rearward finger pressure of the user on the lens at the depression 71 will cause the projection 73 to depress the switch push button 28 sufficient to change the state of the switch and thereby of the FIG. 3B circuit to advance the lighting sequence of the lamps 22R and 22L through another step in their sequence. Manual release of the rearward pressure on the depression 72 allows the projection 73 and central portion 70 of the lens to return to their forward rest position shown in solid line in FIG. 3A. Upon release of the manual rearward pressure on the depression 72, the switch push button 28 returns to its normal rest forward position shown in solid lines in FIG. 3A and the state of the circuit 3B remains stable until the next manual depression of the central lens depression 72.

Figure 10:
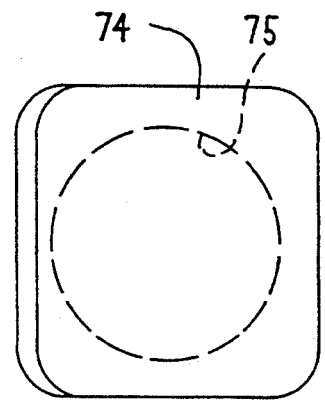
FIG. 10 is an enlarged rear view of the puck of FIG. 3A.

A puck 74 of generally square plan (FIGS. 1 and 10) is of size and shape to fit snugly in the lens depression 72 substantially flush with, or slightly forwardly protruding with respect to, the front face of the lens 12. The puck 74 is preferably fixed in the lens depression 72 by any suitable adhesive. The front of the puck has a central shallow finger dent 75 which positively prevents sidewise skating of the user's finger used to rearwardly depress the lens central portion and depression 72. The finger dent 75 and outline of the puck 74 serve as visual targets for the finger of the user intended to actuate the switch 26. Whereas the sides of the puck 74 and of the depression 71 in the lens front face are substantially perpendicular to the plane of the front face of the central portion of the lens, one side 76 of the puck 74 and the corresponding side of the depression 72 are slightly sloped to assure that the puck 74 will fit easily into and lie flat in the lens depression 72. The puck 74 is preferably of a nontransparent plastic material and thus also serves to hide the switch 26 from the view of an observer located in front of the lens 12.

OPERATION

The light fixture 10 can be installed as follows. With the lens 12 removed from the base 11, the rear edge 17 of the base is applied against the front face of a panel (in, for example, a land recreational vehicle or boat) and the screws 20 are inserted in their holes 21 in the base and threaded into the material of the vehicle panel 16. This rigidly fixes the base 11 to the front of the panel 16 in the manner shown in FIG. 3. The wires 80 and 81 (FIGS. 3 and 3B) are led rearwardly from the fixture 10 through a hole 82 in the panel 16 to a suitable electrical power source, for example, a battery B, which may be a vehicle 12 volt battery. This completes the electrical connections shown in FIG. 3B.

Bulbs 22L and 22R are conventionally installed in the sockets 32L and 32R, respectively. Thereafter, the lens 12 can be snapped into place in front of the base 11 in the manner above described, namely by sliding the tabs 63 rearward along the corresponding sidewalls 14 of the base 11 until such tabs snap into the corresponding holes 60 in the sides 14 of the base 11. With the lens 12 so fixed on the base 11, the projection 73 on the rear side of the central portion of the lens 12 bears on the push button 28 (FIG. 3A) of the switch 26 but does not activate same. Installation of the lamp is thus complete.

To switch the lamp between its all-lamps-off, one-lamp-on, two-lamps-on sequence of states, the user simply displaces rearwardly the puck 74, in turn depressing the switch push button 28 sufficient to change the state of the switch 26 and thus advance the switch 26 another step in the sequence.

To remove the lens 12, so as to replace a bulb 22 or the like, the user simply pulls forwardly and laterally outward on the rear peripheral edge 51 of the lens adjacent each fin 61. This springs the outer peripheral portion of the lens laterally outward and pulls the corresponding tabs 63 out of their respective holes 60 and thereby allows the lens to travel forwardly away from the base 11. The lens can be removed from and replaced on the base repeatedly over time, to the extent needed to replace bulbs 22 or the like.

The base 11 can be inexpensively and easily formed as a one-piece sheet metal stamping and painted a pale, light reflecting color, e.g. white, at least on the front face 13 thereof. In one embodiment, the base was of 0.020 inch stamped steel with a side 14 height of about ¾ inch and overall dimensions of about 10¾ inches length and 4¾ inches width. In one device constructed according to the invention, the lens was of 0.030 inch thick clear plastic, for example a tenite CAB (cellulose acetate butyrate) material, produced by injection molding. The puck, in one device constructed according to the invention, was of a rigid opaque plastic and about 0.13 inch thick by about ¾ inch on a side.

MODIFICATION

Figure 8:
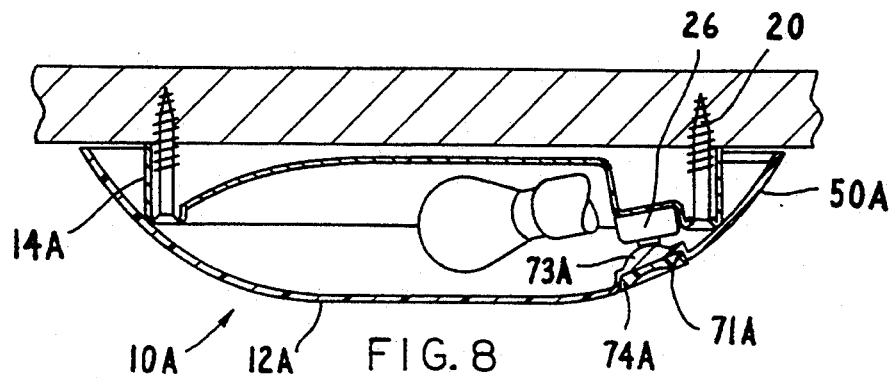
FIG. 8 is a fragmentary sectional view substantially taken on the line 8-8 of FIG. 7.
Figure 7:
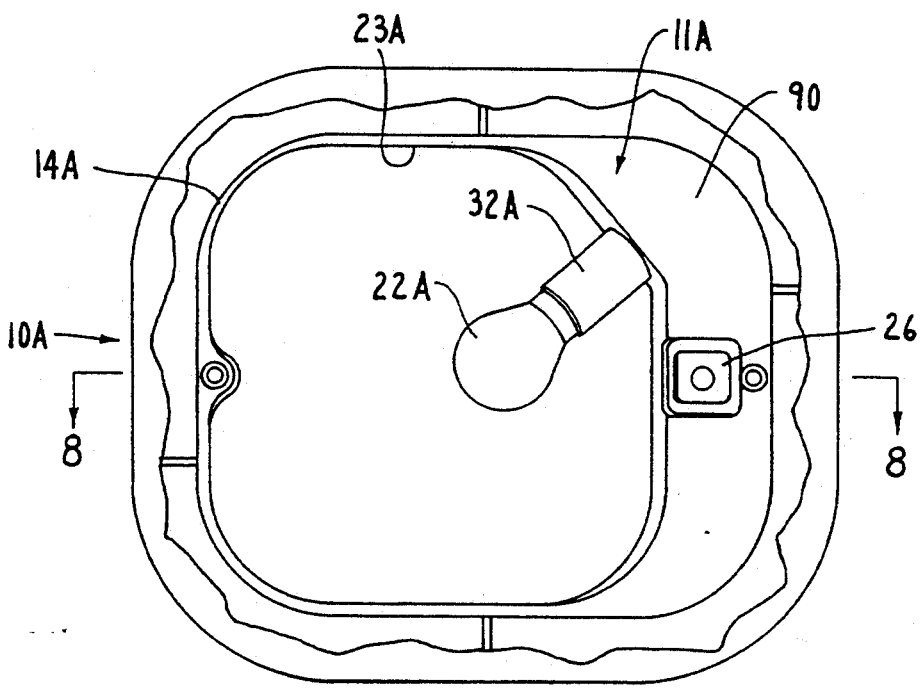
FIG. 7 is a view similar to FIG. 2 but showing a modification, namely a single, rather than double, lamp light fixture.
Figure 9:
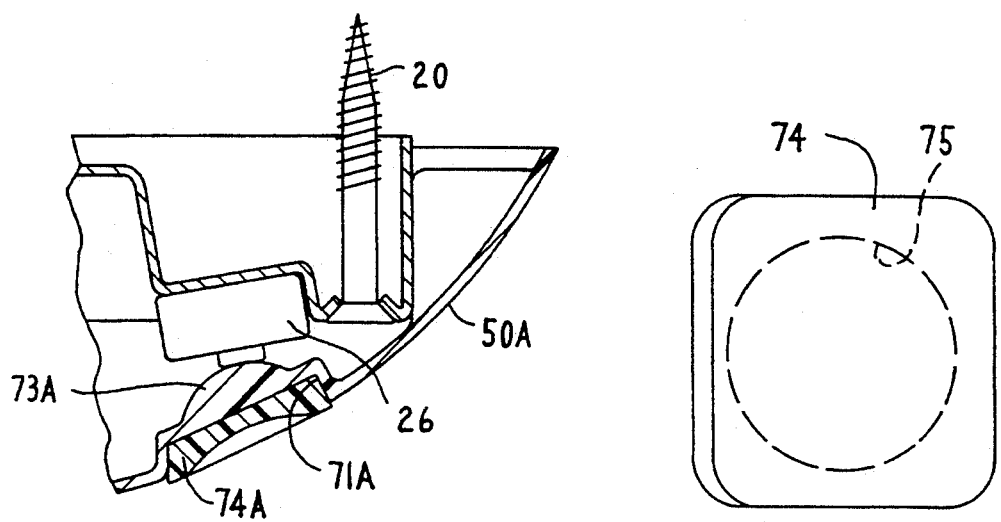
FIG. 9 is an enlarged fragment of FIG. 8.

FIGS. 7, 8 and 9 disclose a modified light fixture 10A which is similar to the light fixture 10 above described, except as follows.

The modified fixture 10A is a single lamp fixture, rather than a double lamp fixture as above disclosed in FIGS. 1-7. The fixture 10A thus has a base 11A with only a single recess 23A, socket 32A and lamp 22A. Instead of a central ridge 24 as in FIGS. 1-7, the modified base 11A has a widened side platform 90 (at the right side thereof in FIGS. 7 and 8) which extends less far forward than the remaining sides 14A. It is this side platform 90 on which mounts the push button switch 26A behind the rearward lens depression 71A. The depression 71A and the puck 74A fitted therein are thus located where the lens 12A begins to curve rearward toward its overhanging upward portion 50A.

Installation and operation of the single lamp fixture 10A are similar to those above described with respect to the dual lamp fixture 10 of FIGS. 1–6 and thus need no further description.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A light fixture, particularly adapted for use in vehicles, including land recreational vehicles and boats, comprising:
    a base fixable on a mounting surface of a vehicle and including means for mounting a lamp to shine forward from said base;
    a light transmitting lens mountable in front of said base and for covering a lamp mounted on said base, said lens being convexly shaped and of lateral dimension exceeding the lateral dimension of the base, said lens having a peripheral portion laterally surrounding said base and adapted to lie close adjacent a mounting surface of a vehicle at a height therefrom less than the height therefrom of said base, said lens having a central portion extending from said peripheral portion and overlapping said base for transmitting light from a lamp on said base, said lens peripheral portion laterally out board of said base having a back face, said base having a peripheral side portion, said lens peripheral portion back face and base peripheral side portion having cooperating mutually engageable mounting means for fixedly mounting said lens on said base, in which said mounting means on said base comprises a hole in the base peripheral side portion, said mounting means on said lens comprising a fin fixed to the lens peripheral portion back face and extending substantially perpendicular therefrom to an inner edge close adjacent to said base at said hole, said fin having a tab having a sloped rear edge for inner edge into said hole, said tab having a sloped rear edge for sliding rearward along said base and into said hole, said tab having a front edge substantially parallel to the axis of said hole for interfering with the front end of said hole to block unintended escape of said tab from said hole and thereby lock said lens on said base.

2. The apparatus of claim 1 in which said lens smoothly convexly curves over the front ad side of said base and extends laterally beyond said base in a substantially unbroken curve.

3. The apparatus of claim 2 in which said base has a peripheral portion, said lens extending closely past said peripheral portion.

4. The apparatus of claim 6 in which said lens mounting means comprises a snap fit mounting means.

5. The apparatus of claim 1 in which said lens has at least two such fins sufficiently circumferentially spaced to lock said lens on said base, said lens being sufficiently flexible that laterally outward and forward deflection of said lens peripheral portion pulls said tab out of said hole and frees said fin from said base.

6. The apparatus of claim 1 in which said lens hides substantially the entirely of said base from view when the light fixture is mounted on a mounting surface of a vehicle.

7. A light fixture, particularly adapted to use in vehicles including land recreational vehicles and boats, comprising:
    a base fixable on a mounting surface of a vehicle and including means for mounting a lamp to shine forward therefrom;
    a light transmitting lens mountable in front of said base and for covering a lamp mounted on said base, said base having a pressure responsive switch behind a central portion of said lens, said lens being flexible sufficient to allow rearward depression of said central portion of said lens toward said switch upon manual pressure on said lens central portion, and means responsive to such rearward depression of said lens central portion for actuating said switch.

8. The apparatus of claim 7 in which said base has two laterally spaced lamp mounting means for mounting two lamps, said switch actuating means being between said two lamp mounting means.

9. The apparatus of claim 7 in which said lens central portion is unbroken in front of said switch actuating means and hides said switch actuating means from view.

10. The apparatus of claim 7 in which said base has a front face with two concave reflective portions separated by a ridge, said switch being mounted on said ridge.

11. The apparatus of claim 10 in which said switch actuating means comprises a puck hand-engageable by the user and disposed fixedly in a depression in the lens overlying said switch, said switch actuating means including said depression.

12. The apparatus of claim 7 in which said lens has a rearward projection opposing and engageable with said switch upon said rearward manual depression of said lens for turning on said lamp, said switch actuating means including said projection.

13. A light fixture particularly adapted for use in vehicles including land recreational vehicles and boats, comprising:
    a base fixable on a mounting surface on a vehicle and including means for mounting a lamp to shine forward therefrom;
    a light transmitting lens mountable in front of said base and for covering a lamp mounted on said base, said base having two laterally spaced lamp mounting means covered by the same lens, said lens thereby being common to both said lamp mounting means for transmitting light therethrough from both lamps, in which said base has a pressure responsive switch behind a central portion of said lens, said lens being flexible sufficient to allow rearward depression of said central portion of said lens toward said switch upon manual pressure on said lens central portion, means responsive to said rearward depression of said lens central portion for actuating said switch, said lens central portion being unbroken in front of said switch actuating means and hiding said switch actuating means from view.

14. The apparatus of claim 13 in which said base is a one-piece integral unit.

15. A light fixture particularly adapted for use in vehicles including land recreational vehicles and boats, comprising:
 a base fixable on a mounting surface of a vehicle and including means for mounting a lamp to shine forward therefrom;
 a light transmitting lens mountable in front of said base and for covering a lamp mounted on said base, said lens extending laterally beyond said base, said lens having a peripheral portion, in which said lens peripheral portion laterally outboard of said base has a back face and said base has a peripheral side portion with said lens peripheral portion back face and base peripheral side portion having cooperating mutually engageable mounting means for fixedly mounting said lens on said base, said mounting means on said base comprising a hole in the peripheral side portion of the base, said mounting means on said lens comprising a fin fixed to said lens peripheral portion back face and extending substantially perpendicular therefrom to an inner edge close adjacent to said base peripheral side portion adjacent said hole, said fin having a tab extending from said inner edge into said hole.

16. The apparatus of claim 15 in which said lens smoothly convexly curves over the front and side of said base and extends laterally beyond said base in a substantially unbroken curve.

17. The apparatus of claim 15 in which said tab has a sloped rear edge for sliding rearward along said base peripheral side portion an into said hole, said tab having a front edge substantially parallel to the axis of said hole for interfering with the front end of said hole to block unintended escape of said tab from said hole and thereby lock said lens on said base, said lens having at least two such fins sufficiently circumferentially spaced to lock said lens on said base, said lens being flexible sufficient that laterally outward and forward deflection of the lens peripheral portion pulls said tab out of said hole and frees said fin from said base.

18. The apparatus of claim 7 in which said base has one lamp mounting means for mounting one lamp, said lens having a peripheral portion located laterally outboard from said switch and lamp mounting means.

19. The apparatus of claim 7 in which said base has a front face with a concave reflective portion and a side platform beside said concave reflective portion, said switch being mounted on said side platform, said lens having a peripheral portion located laterally outboard from said switch.

* * * * *

UNITED STATES PATENT AND TRADEMARK OFFICE
CERTIFICATE OF CORRECTION

PATENT NO. : 5,272,603

DATED : December 21, 1993

INVENTOR(S) : Richard J. CAMAROTA et al

It is certified that error appears in the above-identified patent and that said Letters Patent is hereby corrected as shown below:

On the title page, item [73] Assignee:
    change "ITC Incorporated, Zeeland, Washington" to
    ---ITC Incorporated, Zeeland, Michigan---.

Column 7, line 36; change "out board" to ---outboard---.
    line 48; change "having a sloped rear edge for"
        to ---extending from said---.
    line 57; change "ad" to ---and---.

Column 8, line 4; change "entirely" to ---entirety---.
    line 7; change "to" to ---for---.

Column 10, line 5; change "an" to ---and---.

Signed and Sealed this

Seventeenth Day of May, 1994

*Attest:*

BRUCE LEHMAN

*Attesting Officer*     *Commissioner of Patents and Trademarks*